US006944284B2

(12) United States Patent
Goodings

(10) Patent No.: US 6,944,284 B2
(45) Date of Patent: Sep. 13, 2005

(54) PULSED VOLUME CONTROL OF A MAGNETIC RINGER

(75) Inventor: Chris Goodings, Fleet (GB)

(73) Assignee: VTech Communications, Ltd., Tai Po (HK)

(*) Notice: Subject to any disclaimer, the term of this patent is extended or adjusted under 35 U.S.C. 154(b) by 568 days.

(21) Appl. No.: 10/035,864

(22) Filed: Dec. 26, 2001

(65) Prior Publication Data

US 2003/0099348 A1 May 29, 2003

(30) Foreign Application Priority Data

Dec. 29, 2000 (GB) ............................................ 0031815

(51) Int. Cl.[7] ............................................ H04M 19/04

(52) U.S. Cl. ............................ 379/373.02; 379/375.01; 379/418; 381/104

(58) Field of Search ....................... 379/373.01, 373.02, 379/375.01, 376.02, 418; 381/104–109; 340/392.3

(56) References Cited

U.S. PATENT DOCUMENTS 4,644,106 A * 2/1987 Yeh ....................... 379/375.01
5,323,456 A 6/1994 Oprea
5,802,187 A 9/1998 Hsu

FOREIGN PATENT DOCUMENTS

| | | |
|---|---|---|
| DE | 42 18 655 A1 | 12/1992 |
| GB | 2259 775 | 12/1992 |

OTHER PUBLICATIONS

English Translation of German Office Action.

GB Search Report.

* cited by examiner

*Primary Examiner*—Sinh Tran
*Assistant Examiner*—Daniel Swerdlow
(74) *Attorney, Agent, or Firm*—Pillsbury Winthrop Shaw Pittman LLP

(57) ABSTRACT

A digital circuit for driving an audio transducer that provides consistent tonal quality over a range of volume levels, without requiring a variable gain analog amplifier. A fixed amplitude ringer tone is multiplied, or amplitude modulated, by a higher frequency digital pulse train to produce a transducer driving signal. The timbre of the transducer driving signal is similar to that of the fixed amplitude ringer tone, but the volume of the sound produced by the transducer varies with the mark-space ratio of the pulse train.

22 Claims, 4 Drawing Sheets

PULSED VOLUME CONTROL OF A MAGNETIC RINGER

BACKGROUND OF THE INVENTION

1. Field of the Invention

This invention relates in general to audible alerting mechanisms. In particular, the invention discloses a technique for controlling the volume of sound generated by a magnetic transducer, such as those used for producing ringing tones in a telephone system signaling an incoming telephone call.

2. Background Art

Telephone receiver products typically include audible ringers to alert users to the presence of an incoming call. Such telephone ringers often employ a form of magnetic transducer to convert an electrical ringing signal into an audible tone. Because telephones are ubiquitous, and used in a wide range of physical environments, most telephones also provide for the user to be able to control the ringer volume produced by the magnetic transducer. As a result, telephones can be used effectively in noisy environments, such as a factory or warehouse, where a high ringer volume is required to ensure that incoming call signals can be heard, as well as in quiet environments, such as an individual office, where a low volume is sufficient to adequately alert the office occupants to an incoming call. Adjustment of ringer volume also allows for the selection of a wide range of personal preferences as to the desired ringer volume.

Many conventional ringers produce their sound by driving a transducer with a square wave signal. One technique for controlling the volume of such a ringer is to vary the amplitude of the square wave signal. This technique is depicted in FIG. 1. FIG. 1(*a*) depicts a full volume square wave, while FIG. 1(*b*) depicts a reduced amplitude square wave. However, amplitude control requires that the telephone set include a circuit that produces a driving signal with a variable amplitude. Such circuits typically require an analog driver stage subsequent to the driving signal generator, thereby introducing additional circuit components to the telephone design that would not be necessary if the transducer were driven, for example, solely by a digital controller generating a square wave generated by mere toggling of a digital logic line. These additional analog components increase both the size and the cost of the circuit. Even if a telephone set is designed using components such as an application specific integrated circuit (ASIC), integration of an analog driver section may result in an ASIC with larger die size, more complex design, and reduced reliability than would be the case for a purely digital design. Therefore, it is an object of the invention to provide a ringer with volume control that does not require an analog variable-gain driver.

Another method for controlling the volume of a ringer signal is pulse-width-modulation (PWM), which use results in the signal depicted in FIG. 1(*c*). This technique produces reduced volume by reducing the pulse width of the driving signal. While PWM provides an entirely digital solution to ringer volume control, the disadvantage of this method is that the timbre of the ringer signal (i.e. its harmonic content) changes as the width of driving signal pulses is varied. To the user, this characteristic causes lower volumes to sound "tinnier" than higher volumes, since low frequency components of the signal are attenuated more than high frequency components when pulse width is reduced. Therefore, it is also an object of this invention to provide a circuit with improved consistency in the tone quality of a ringer sound over a range of ringer volumes that can be implemented as a digital circuit.

These and other objects of the present invention will become apparent in light of the present specifications and drawings.

SUMMARY OF THE INVENTION

A method and apparatus for providing a variable volume audible alert signal is implemented by a digital circuit driving an audio transducer, such as the magnetic transducers commonly utilized as telephone ringers in telephone sets used to signal an incoming telephone call. A full volume ringer driving signal, such as a square wave, in the audible frequency range is first generated. A volume-control signal is also generated, comprising a pulse-width modulated pulse train signal. The full volume ringer signal is multiplied, or amplitude modulated, by the pulse train signal, to generate a resulting output signal that drives a transducer. The frequency of the pulse train signal may be specified as greater than the audible frequency range and/or greater than the transducer cutoff frequency to minimize unwanted audible artifacts. The volume produced by the transducer when driven by the resulting output signal is dependent upon the mark-space ratio of the pulse train signal. However, the timbre of the transducer output in the audio band is relatively consistent, across a range of pulse train signal mark-space ratios.

DETAILED DESCRIPTION OF THE DRAWINGS

Figure 1:
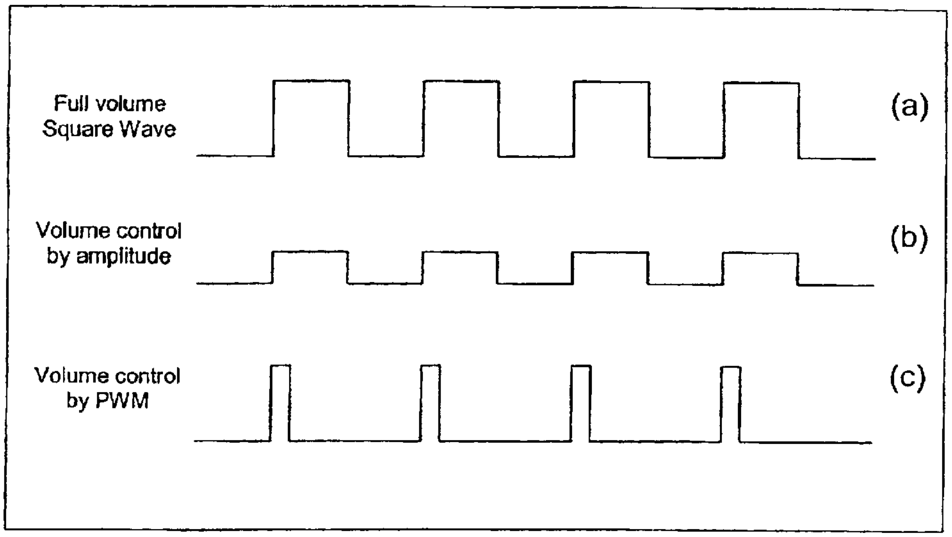
PRIOR ART Figure 1
FIG. 1 is a time-domain plot of signals typically used to drive audio transducers for prior art telephone ringers.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated.

According to the present invention, the volume of an audio transducer is controlled by amplitude modulating a ringer tone waveform with a second higher frequency pulse train waveform. The second waveform is pulse width modulated, and the volume of sound produced by the ringer is proportional to the mark-space ratio cycle of the pulse train. While the invention can easily be utilized in conjunction with numerous types of audio transducers known in the art, and for a variety of applications requiring audible notification of a condition or event, it is particularly well suited to the voltage and current requirements of magnetic type ringers commonly used in telephones.

Figure 2:
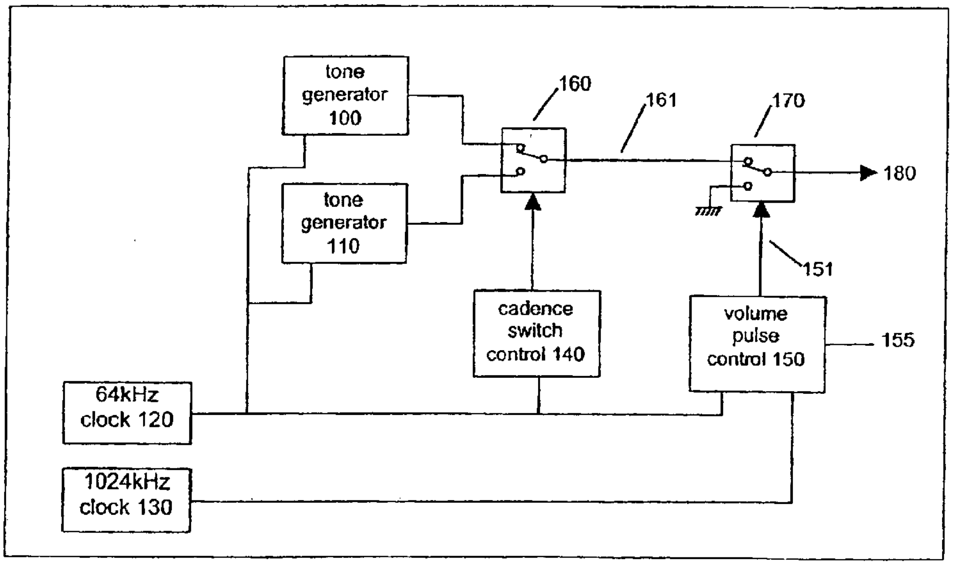
FIG. 2 is a schematic block diagram of a circuit for generating a ringer signal in accordance with the present invention.

One embodiment of the invention is illustrated in FIG. 2. Clock 120 operates as a frequency reference for tone generators 100 and 110. Each tone generator 100 and 110 outputs a digital square wave of predetermined frequency. Cadence control switch 140 operates to periodically toggle switch 160 between the tone generators, such that a standard full volume telephone ringer signal is produced on line 161.

The standard telephone ringer signal is then applied to a first input of switch 170. A second input of switch 170 is connected to ground. The state of switch 170 is controlled by volume pulse control circuit 150, which generates a pulse width modulated ("PWM") control signal 151. Circuit 150 receives two clock reference signals. Clock 120 provides a signal defining the frequency at which switch 170 is toggled. Clock 130 provides a clock signal of frequency higher than that of clock 120, which controls the resolution of the mark-space ratio of PWM control signal 151. Signal 151 causes switch 170 to rapidly switch between the ringer tone on line 161 when signal 151 resides in the logic high, or mark, state, and a silent, grounded input when signal 151 resides in the logic low, or space, state. The resulting output 180 of switch 170 is a volume controlled ringer signal, which is applied to a transducer.

In the embodiment of FIG. 2, the number of discrete volume levels that can be produced is determined by the ratio of clock 130 to clock 120. The actual volume selection is controlled by a signal on line 155. In the illustrated embodiment, with a 1024 kHz frequency of clock 130, and a 64 kHz clock 120, the number of volume settings is 16. Specifically, for each positive going half of a cycle of clock 120, clock 130 cycles 16 times. Therefore, the signal from clock 120 can be pulse width modulated with mark-space ratios between 6.25%, where the PWM signal mark is one cycle of clock 130 and the space lasts 15 cycles of clock 130, and 100%, in which the PWM signal mark lasts through all sixteen cycles of clock 130.

The ringer circuit of FIG. 2 is a block diagram illustrating the basic building blocks of the present invention, the function of which can readily be implemented using a variety of alternative digital logic configurations know to those skilled in the art. For example, the function of switch 170 could readily be implemented with identical result by using a digital multiplier, or a digital logic AND gate, either one of which would receive lines 161 and 151 as inputs.

Figure 3:
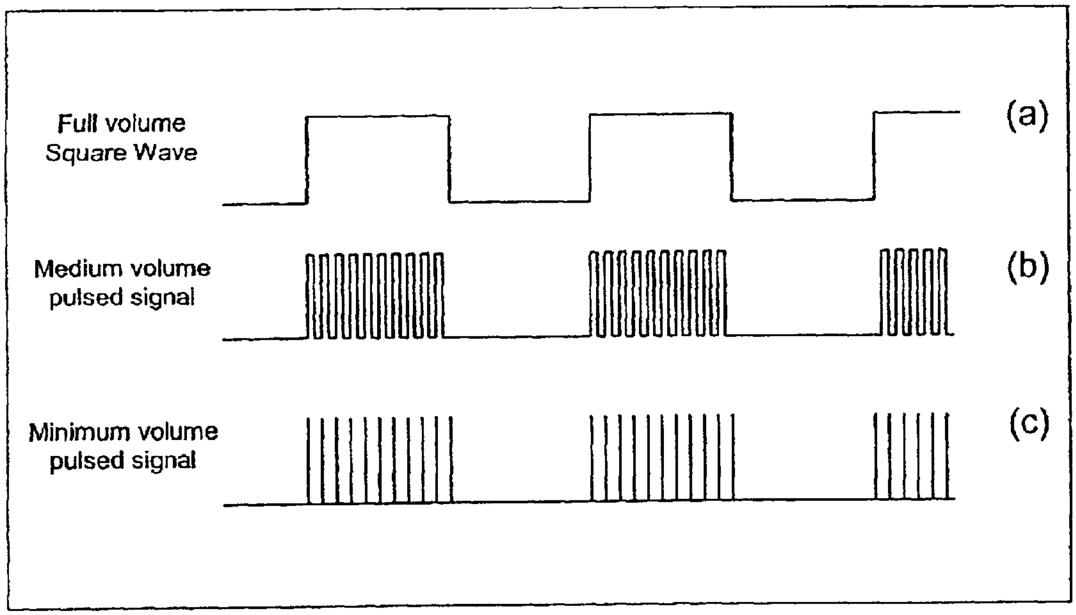
FIG. 3 is a time-domain plot of ringer signals generated according to the present invention for producing full, medium and low ringer volumes.
Figure 4:
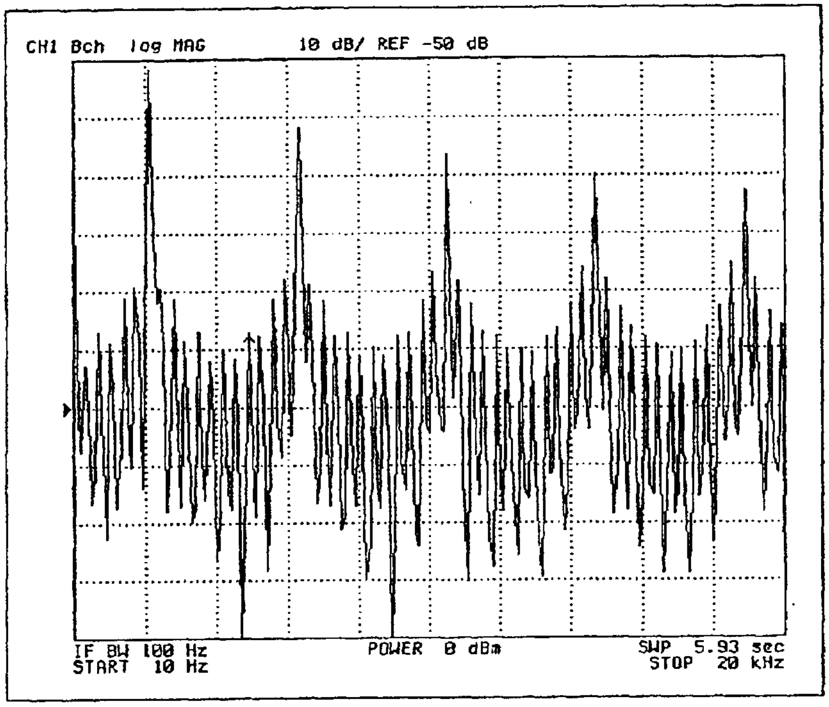
FIG. 4 is a frequency-domain plot of a ringer output when driven with a full volume signal.

The waveforms generated by the ringer driving circuit are shown in FIG. 3. FIG. 3(*a*) depicts a full volume ringer signal according to the present invention. At full volume, the duty cycle of control signal 151 is 100%. Therefore, switch 170 is maintained in its illustrated position, such that the square wave ringer tone on line 161 is passed to output 180 unaltered. A frequency spectrum analyzer measurement of a magnetic transducer driven by the pure, full volume square wave ringer output of FIG. 3(*a*) appears in FIG. 4. The plot illustrates the concentration of energy in the odd numbered harmonics of the fundamental ringer frequency, which is characteristic for a square wave signal. Thus, at full volume, the present invention produces a tone of conventional timbre, with which many users may be familiar.

FIG. 3(*b*) illustrates a medium volume ringer signal waveform according to the present invention. Volume pulse control circuit 150 receives a signal requesting medium ringer volume on line 155. Control circuit 150 generates a 64 kHz PWM pulse train with a 50% mark-space ratio, such that control signal 151 alternates between a mark during eight consecutive cycles of clock 130, followed by a space during the subsequent eight cycles of clock 130. Signal 151 causes output 180 of switch 170 to rapidly and evenly alternate between the ringer tone of line 161, and ground, resulting the ringer signal depicted in FIG. 3(*b*).

Figure 5:
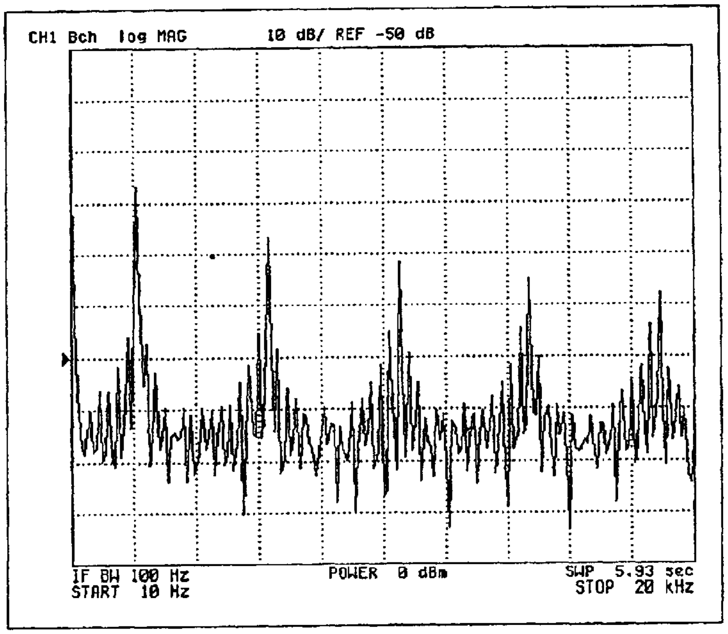
FIG. 5 is a frequency-domain plot of a ringer output when driven with a reduced volume ringer signal according to the present invention.

FIG. 5 is a frequency spectrum analyzer plot of the output of a magnetic transducer driven by the medium volume waveform of FIG. 3(*b*). As with the full volume output of FIG. 4, the reduced volume output of FIG. 5 shows audible energy concentration at the odd harmonics, as is characteristic of a pure square wave signal. However, the amplitudes of each harmonic are substantially reduced in comparison to the pure square wave output of FIG. 4. Thus, a reduced volume ringer tone is produced with a "square wave timbre". The variable volume ringer signal is thus generated entirely digitally without requiring any analog, variable gain amplifier circuits.

FIG. 3(*c*) demonstrates a further reduced volume ringer signal, in which switch 170 is controlled by volume control circuit 150 generating a 64 kHz PWM pulse train with a mark-space ratio of 6.25%. Specifically, signal 151 remains in a mark state for one cycle of clock 130, followed by fifteen cycles of the space state. Thus, output 180 is comprised of one cycle of signal 161, alternating with fifteen cycles of grounded signal.

As with the waveform of FIG. 3(*b*), a ringer driven by the FIG. 3(*c*) waveform generates an audio signal with odd harmonics, such that its tonal quality is much like that of a square wave. However, the volume of the output is even further reduced, thus enabling an even lower ringer volume setting, again implemented without requiring any variable gain analog amplifier. Additional intermediate volume settings can be achieved by implementing intermediate pulse train mark-space ratios.

Figure 6:
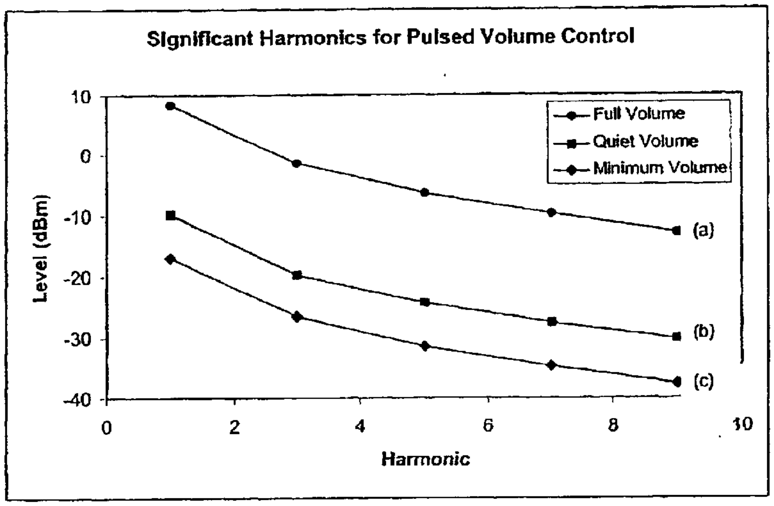
FIG. 6 is a plot of ringer output harmonic levels when driven at full, medium and low volumes according to the present invention.

FIG. 6 compares the power levels of the odd signal harmonics for each of the transducer driving waveforms of FIG. 3. Specifically, the pure square wave of FIG. 3(*a*) corresponds to the power levels plotted in FIG. 6(*a*). Likewise, the waveform of FIG. 3(*b*) corresponds to the power levels of FIG. 6(*b*), and the waveform of FIG. 3(*c*) corresponds to the power levels of FIG. 6(*c*). FIG. 6 illustrates that the power ratios between harmonics for the reduced volume levels of FIGS. 6(*b*) and 6(*c*), remain similar to the ratios for the pure square wave signal of FIG. 6(*a*). Thus, the tonal quality of the transducer output is preserved despite the reduction in output power.

Figure 7:
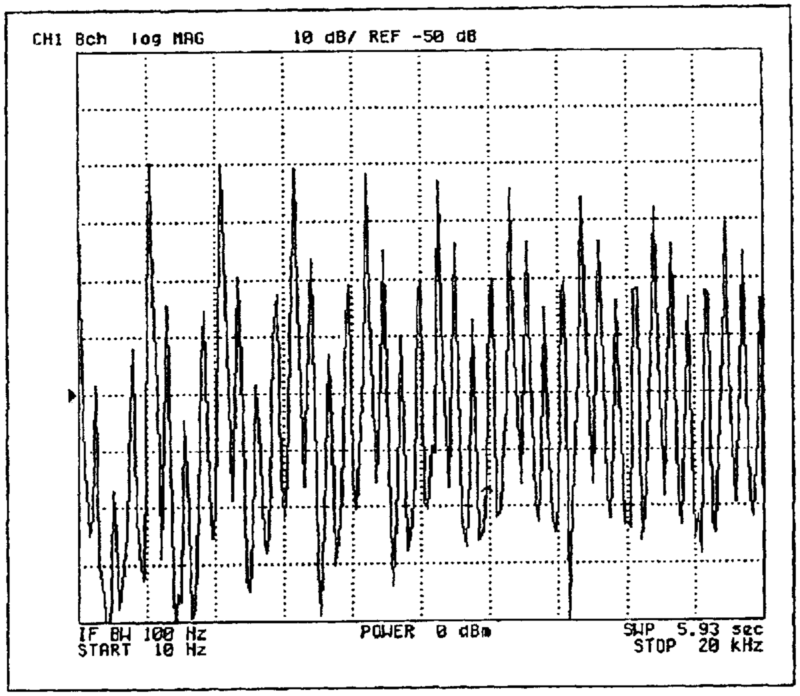
FIG. 7 is a frequency-domain plot of a ringer output when driven with a reduced volume ringer signal according to the prior art pulse width modulation technique.
Figure 8:
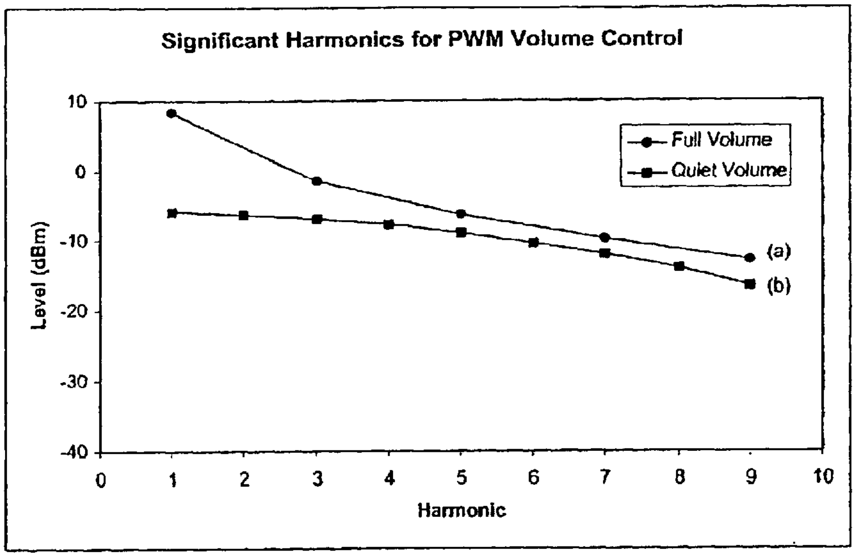
FIG. 8 is a plot of ringer output harmonic levels when driven at full and reduced volumes according to the prior art pulse width modulation technique.

By contrast, FIG. 7 depicts the frequency spectrum output of a magnetic transducer driver by a reduced-volume PCM signal, such as that of FIG. 1(*c*). The spectrum reveals the presence of substantial levels of even harmonics. Moreover, the odd harmonic level proportions of FIG. 7 differ substantially from those of FIGS. 4 and 5, falling off more slowly. FIG. 8 illustrates the substantial differences between the harmonic power levels of the transducer driven by a pure square wave (FIG. 8(*a*)), and the transducer driven by the prior art reduced-volume PCM signal (FIG. 8(*b*)). Thus, the prior art PCM signal of FIG. 1(*c*) causes the ringer tone to change as volume is reduced, becoming tinny, whereas the present invention provides for a digitally implemented, variable volume ringer with consistent tonal quality.

While the illustrated embodiment employs frequencies of 64 kHz and 1024 kHz for clocks 120 and 130, respectively, other frequencies can readily be implemented. However, in selecting operational frequencies, attention should be paid to the avoidance of undesired signal distortion due to mixing products, and the tradeoff between power consumption and volume setting resolution.

In operation, the invention involves the multiplication, or amplitude modulation, of the full-volume ringer signal by the PWM pulse train, to generate a reduced amplitude baseband signal. However, modulation inherently generates additional mixing products that can potentially lead to audible distortion of the ringer output. To reduce the risk of audible distortion caused by mixing products, the frequency of the PWM pulse train can be selected to be above the audible frequency range, and/or the passband of the transducer.

Furthermore, even to the extent that the pulse train frequency lies beyond the audible frequency range, many transducers exhibit nonlinearities in their response that can cause high frequency mixing products to be folded back into the audible bandwidth. Therefore, audible artifacts may be reduced when using a transducer with substantial nonlinearities by choosing a pulse train frequency well above the transducer cutoff.

Finally, a tradeoff between power consumption and volume setting resolution may be considered in choosing the frequency of clock 130. The greater the ratio between the frequencies of clocks 130 and 120, the greater the range and resolution of volume settings that can be produced. However, the power consumption of the digital circuitry also increases with increased clock speeds. Appropriate clock speeds can be chosen based upon design considerations for a particular application.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method of controlling the sound volume produced by an audio transducer, the method comprising the steps of:

generating a first signal that is in the audible frequency range;

generating a second signal where the second signal is a digital pulse train signal with a mark-space ratio of less than 100%, where the frequency of the second signal is higher than the frequency of the first signal;

modulating the amplitude of the first signal with the digital pulse train signal to generate an output signal with similar timbre to that of the first signal; and applying the output signal to the audio transducer;

whereby the volume of sound produced by the audio transducer varies with the mark-space ratio of the digital pulse train signal, wherein the frequency of the second signal is determined by a first clock frequency, and the mark space ratio of the second signal is a multiple of a ratio of the first clock frequency to a second clock frequency that is higher than the first clock frequency.

2. The method of claim 1, in which the first signal is a square wave which alternates between digital logic high and logic low levels.

3. The method of claim 1, in which the duty cycle of the digital pulse train signal is approximately 50%.

4. The method of claim 1, in which the frequency of the digital pulse train signal is above the range of human hearing.

5. The method of claim 1, in which the frequency of the digital pulse train signal is greater than the cutoff frequency of the audio transducer.

6. The method of claim 1, in which the frequency of the digital pulse train signal is approximately 64 kHz.

7. A method of generating a telephone ringing signal, the method comprising the steps of:

selecting a desired ring volume level;

generating a full volume telephone ringing signal; and multiplying the full volume ringing signal by a pulse train signal with mark-space ratio less than 100% to generate an output signal, where the pulse train signal has a frequency higher than a frequency of the full volume ringing signal, where the mark-space ratio of the pulse train signal is dependent upon the selected desired ring volume level, wherein the frequency of the pulse train signal is determined by a first clock frequency, and the mark space ratio of the pulse train signal is a multiple of a ratio of the first clock frequency to a second clock frequency that is higher than the first clock frequency;

applying the output signal to an audio transducer;

whereby the audio transducer produces a reduced volume ring sound with similar timbre to that of the full volume telephone ringing signal.

8. A telephone set that can produce a ringing signal of varying volume upon receipt of an incoming telephone call to indicate that an incoming call is being received, which telephone is comprised of:

a user interface, which user interface permits the user to specify a desired ringing signal volume level;

a tone generator which generates a telephone ring signal;

a digital pulse train generator which receives the volume level specified by the user and generates a pulse width modulated pulse train signal with a mark-space ratio that is determined by the specified volume level, where the pulse width modulated pulse train signal has a frequency higher than a frequency of the full volume ringing signal;

a switch controlled by the output of the digital pulse train generator, such that the switch output receives the tone generator output when the pulse train generator outputs a mark and such that the switch output receives a logic low level when the pulse train generator outputs a space; and an audio transducer connected to the switch output for presenting an audible ringing signal to the user, whereby the volume of the audio transducer output varies depending upon the volume level selected using the user interface, wherein the frequency of the pulse width modulated pulse train signal is determined by a first clock frequency, and the mark space ratio of the pulse width modulated pulse train signal is a multiple of a ratio of the first clock frequency to a second clock frequency that is higher than the first clock frequency.

9. The telephone of claim 8, in which the telephone ring signal is a digital signal alternating between logic high and logic low levels.

10. The method of claim 8, in which the frequency of the pulse width modulated pulse train signal is above the range of human hearing.

11. The method of claim 8, in which the frequency of the pulse width modulated pulse train signal is greater than the cutoff frequency of the audio transducer.

12. The method of claim 8, in which the frequency of the pulse width modulated pulse train signal is approximately 64 kHz.

13. A telephone set that can produce a ringing signal of varying volume upon receipt of an incoming telephone call to indicate that an incoming call is being received, which telephone is comprised of:

a user interface, which user interface permits the user to specify a desired ringing signal volume level;

a tone generator which generates a telephone ring signal comprised of a digital square wave;

a digital pulse train generator which receives the volume level specified by the user and generates a pulse width modulated pulse train signal with a mark-space ratio that is determined by the specified volume level, where the pulse width modulated pulse train signal has a frequency higher than a frequency of the full volume ringing signal;

a multiplier to which the telephone ring signal and digital pulse train signal are applied; and an audio transducer connected to the multiplier output for presenting an audible ringing signal to the user, whereby the volume of the audio transducer output varies depending upon the volume level selected using the user interface, wherein the frequency of the pulse width modulated pulse train signal is determined by a first clock frequency, and the mark space ratio of the pulse width modulated pulse train signal is a multiple of a ratio of the first clock frequency to a second clock frequency that is higher than the first clock frequency.

14. The telephone of claim 13, in which the frequency of the pulse width modulated pulse train signal is above the range of human hearing.

15. The telephone of claim 13, in which the frequency of the pulse width modulated pulse train signal is greater than the cutoff frequency of the audio transducer.

16. The telephone of claim 13, in which the frequency of the pulse width modulated pulse train signal is approximately 64 kHz.

17. The telephone of claim 13, where the multiplier is a digital logic AND gate that receives the ring signal and pulse train signal as inputs.

18. An audible alert circuit which is comprised of:

a square wave tone generator;

a digital pulse train generator outputting a pulse width modulated pulse train signal with a mark-space ratio less than 100%, where the pulse width modulated pulse train signal has a frequency higher than a frequency of the full volume ringing signal;

a multiplier to which the outputs of the square wave tone generator and digital pulse train generator are applied; and an audio transducer connected to the multiplier output, wherein the frequency of the pulse width modulated pulse train signal is determined by a first clock frequency, and the mark space ratio of the pulse width modulated pulse train signal is a multiple of a ratio of the first clock frequency to a second clock frequency that is higher than the first clock frequency, whereby an audible alert signal is generated having a volume level determined by the mark-space ratio of the pulse width modulated pulse train signal.

19. The audible alert circuit of claim 18, in which the frequency of the pulse width modulated pulse train signal is above the range of human hearing.

20. The audible alert circuit of claim 18, in which the frequency of the pulse width modulated pulse train signal is greater than the cutoff frequency of the audio transducer.

21. The audible alert circuit of claim 18, in which the frequency of the pulse width modulated pulse train signal is approximately 64 kHz.

22. The audible alert circuit of claim 18, where the multiplier is a digital logic AND gate that receives the outputs of the square wave tone generator and digital pulse train generator as inputs.

* * * * *